United States Patent
Wang

(10) Patent No.: US 7,428,108 B2
(45) Date of Patent: Sep. 23, 2008

(54) OPTICAL ZOOM LENS MODULE AND ELECTRONIC DEVICE

(75) Inventor: Ming-Yih Wang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 11/776,547

(22) Filed: Jul. 11, 2007

(65) Prior Publication Data

US 2008/0013189 A1   Jan. 17, 2008

(30) Foreign Application Priority Data

Jul. 12, 2006 (CN) .................. 2006 1 0099001

(51) Int. Cl.
*G02B 15/14* (2006.01)
*G02B 7/02* (2006.01)

(52) U.S. Cl. ...................................... 359/696; 697/819

(58) Field of Classification Search ......... 359/694–701, 359/819–823
See application file for complete search history.

(56) References Cited

U.S. PATENT DOCUMENTS

| 6,714,357 B2 * | 3/2004 | Yamazaki | 359/696 |
| 7,236,316 B2 * | 6/2007 | Miki | 359/819 |
| 2005/0280903 A1 * | 12/2005 | Oshima et al. | 359/697 |

* cited by examiner

*Primary Examiner*—Mohammed Hasan
(74) *Attorney, Agent, or Firm*—Jianq Chyun IP Office

(57) ABSTRACT

An optical zoom lens module including a base, a first lens holder, a first tracking controller, a first lens, a second lens holder, a second tracking controller, and a second lens is provided. The base has a main shaft, a secondary shaft, and an opening. The first and second lens holders having a first and a second fixing portion disposed to the secondary shaft are disposed on the base. The first and second tracking controllers covering each other and connected to the first and the second lens holders cover the main shaft. The first lens is disposed on the first lens holder and above the opening. The second lens is disposed on the second lens holder and between the first lens and the opening. The first and second tracking controllers are suitable for moving along the main shaft to adjust the relative distance between the first and the second lens.

14 Claims, 7 Drawing Sheets

OPTICAL ZOOM LENS MODULE AND ELECTRONIC DEVICE

CROSS-REFERENCE TO RELATED APPLICATION

This application claims the priority benefit of China application serial no. 200610099001.1, filed Jul. 12, 2006. All disclosure of the China application is incorporated herein by reference.

BACKGROUND OF THE INVENTION

1. Field of the Invention

The present invention relates to an electronic device and a lens module thereof. More particularly, the present invention relates to an electronic device having shorter main shaft and an optical zoom lens module thereof.

2. Description of Related Art

Nowadays, in addition to communicating with each other, the mobile phone device has such functions as sending/receiving SMS and e-mails, playing radio and MP3 music, and taking photos. Especially the camera function which can be used for taking photos instantly is popular among young consumers. A mobile phone having camera function is because that an imaging device for capturing image of an object is disposed in the mobile phone device. The imaging device is mainly composed of an optical zoom lens module and a photosensitive device, and the image of an object is focused on the photosensitive device through the optical zooming of the optical zoom lens module.

FIG. 1A is a diagram of a conventional optical zoom lens module at 2× optical zoom. Referring to FIG. 1A, the conventional optical zoom lens module 100 includes two "⊂" shape lens holders 122 and 124 disposed on a main shaft 110, and two lenses 132 and 134 respectively held by the lens holders 122 and 124. When the optical zoom lens module 100 is at 2× optical zoom, the lens 132 is close to the lens 134, and the two lens holders 122 and 124 are in contact with each other and two spans are formed. Since the spans take up part of the height of the main shaft 110, the spans are one of the major factors for designing the height of the main shaft 110 to prevent insufficient moving distance of the lens holders 122 and 124 caused by insufficient height of the main shaft 110, which may affect the effect of optical zooming.

FIG. 1B is a diagram of the optical zoom lens module in FIG. 1A at 1× optical zoom. Referring to FIG. 1A and FIG. 1B together, when the optical zooming multiple of the optical zoom lens module 100 is adjusted, the positions of the lenses 132, 134 and the relative distance between the lens 132 and 134 are adjusted by moving the lens holders 122 and 124 at the same time. As shown in FIG. 1B, when the optical zoom lens module 100 is at 1× zoom, the lens 132 is away from the lens 134, however, one end of the lens holder 122 and one end of the lens holder 124 are still in contact to form a span which takes up the height of the main shaft 110. As described above, when designing the height of the main shaft 110 of the conventional optical zoom lens module 100, the span formed by the two lens holders 122 and 124 has to take into consideration besides the zooming interaction distance of the lenses 132 and 134 accordingly, so that the thickness of the entire mobile phone device is affected.

SUMMARY OF THE INVENTION

Accordingly, the present invention is directed to provide an optical zoom lens module having shorter main shaft.

According to another aspect of the present invention, a thinner electronic device is provided.

To achieve the aforementioned and other objectives, the present invention provides an optical zoom lens module for an electronic device. The optical zoom lens module includes a base, a first lens holder, a first tracking controller, a first lens, a second lens holder, a second tracking controller, and a second lens. The base has a main shaft, a secondary shaft, and an opening. The first lens holder is disposed on the base and has a first fixing portion disposed on the secondary shaft. The first tracking controller is connected to the first lens holder and covers the main shaft. The first lens is disposed on the first lens holder and above the opening. Moreover, the second lens holder is disposed on the base and has a second fixing portion disposed at the secondary shaft. The second tracking controller is connected to the second lens holder and covers the main shaft, wherein the first and the second tracking controllers cover each other. The second lens is disposed on the second lens holder and between the first lens and the opening.

According to an embodiment of the present invention, the first tracking controller covers the second tracking controller.

According to an embodiment of the present invention, the optical zoom lens module further includes an arc guiding plate disposed on the base and located outside of the first and the second tracking controllers, and the arc guiding plate is suitable for driving the first and the second tracking controllers to move, so as to adjust the relative distance between the first lens and the second lens.

According to an embodiment of the present invention, the arc guiding plate has a plurality of guiding slots, and the first and the second tracking controllers respectively have a bump, wherein the bumps are suitable for moving along one of the guiding slots respectively to drive the first tracking controller to move relatively to the second tracking controller.

According to an embodiment of the present invention, the optical zoom lens module further includes a transmission mechanism disposed on the base and located outside of the arc guiding plate. The transmission mechanism includes a gear and a driving motor, wherein the gear is disposed outside of the arc guiding plate and meshes with the arc guiding plate. The driving motor is disposed on the base and meshes with the gear to drive the arc guiding plate through the gear, so that the first tracking controller moves relatively to the second tracking controller.

According to an embodiment of the present invention, the base has an arc slot, and the arc guiding plate is locked with the arc slot.

The embodiment of the present invention further provides an electronic device using the optical zoom lens module described above. The electronic device includes a first housing, a second housing, an optical zoom lens module described above, and a photosensitive device. The second housing is disposed opposite to the first housing. The optical zoom lens module is disposed between the first housing and the second housing. The photosensitive device is disposed between the optical zoom lens module and the second housing. Besides, the first and the second tracking controllers are suitable for moving along the main shaft to adjust the relative distance between the first lens and the second lens and to expose the image of an object by the photosensitive device.

According to an embodiment of the present invention, the material of the first housing and the second housing is plastic or metal.

According to an embodiment of the present invention, the photosensitive device includes a complementary metal oxide semiconductor (CMOS) device or a charge coupled device (CCD).

According to the optical zoom lens module in the present invention, two tracking controllers covering the main shaft are used for adjusting the relative distance between the two lenses. Since the two tracking controllers cover each other to drive the two lens holders to move along the main shaft, the contact between the two tracking controllers will not form span in the direction of the height of the main shaft, so that the conventional problem of span taking up the height of the main shaft is resolved. Accordingly, the height of the main shaft can be reduced effectively, and the electronic device using the optical zoom lens module in the present invention can be designed thinner.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
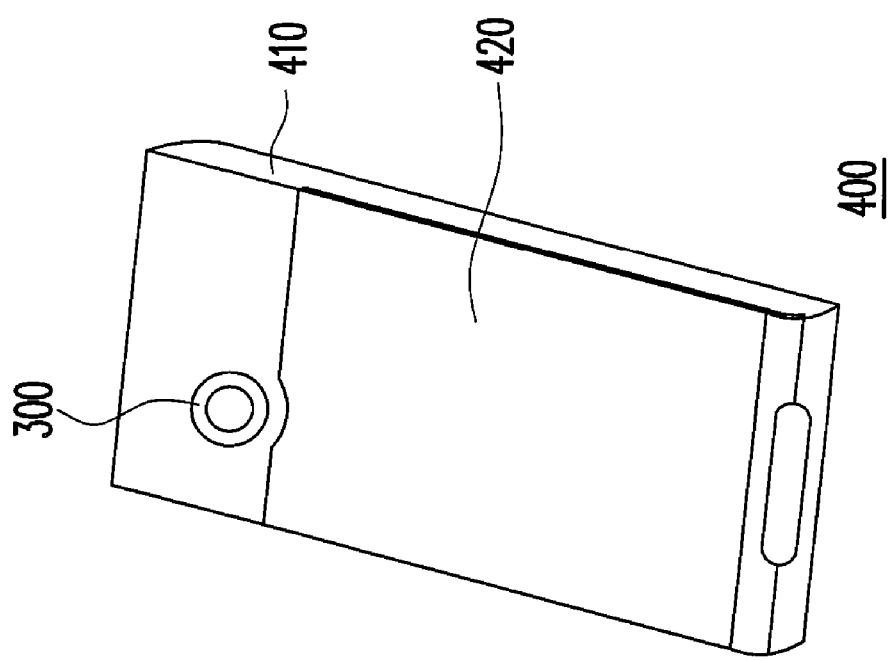
FIG. 2 is a diagram of an electronic device according to an embodiment of the present invention.
Figure 3:
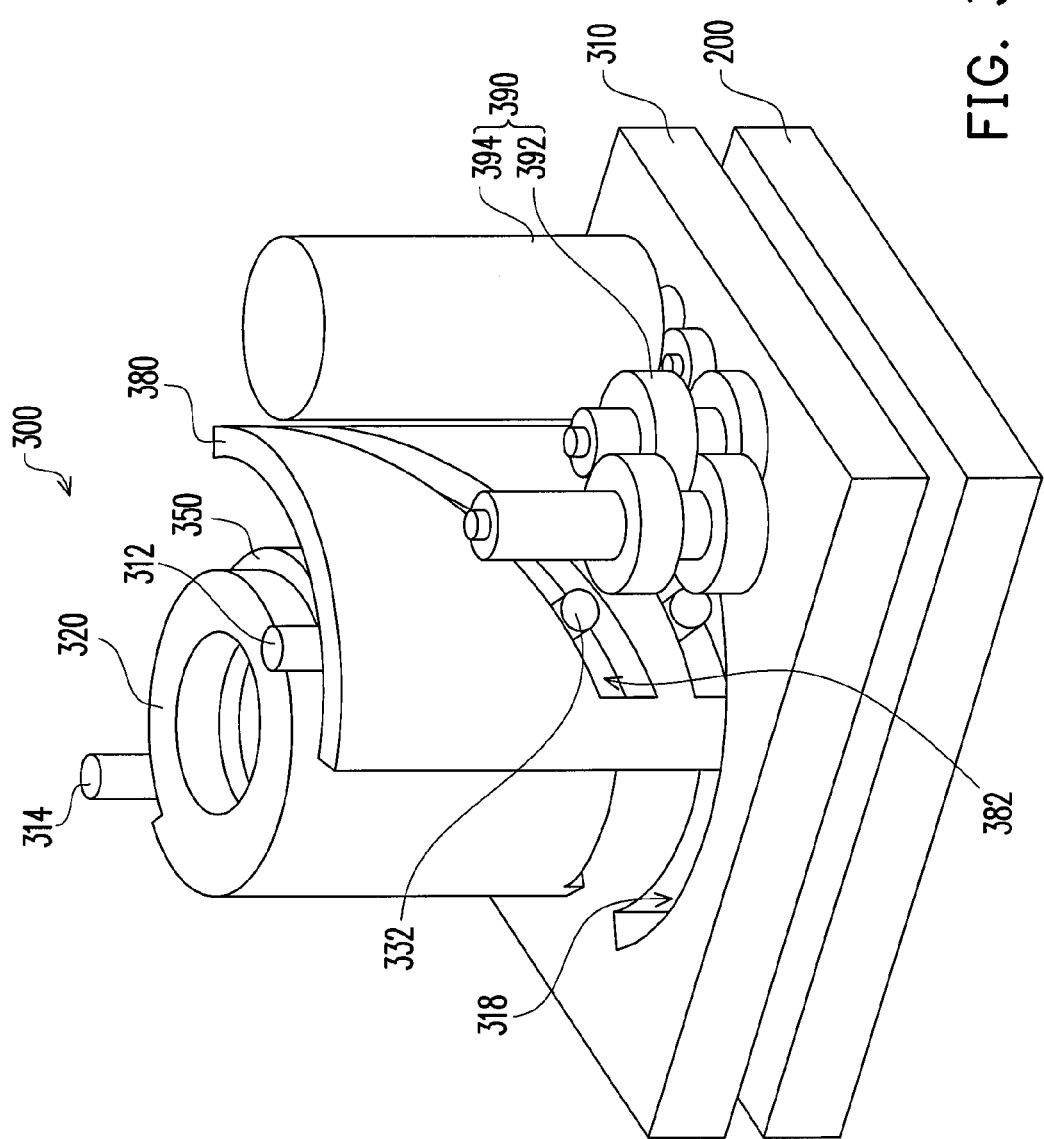
FIG. 3 is a partial view of the electronic device in FIG. 2.

FIG. 2 is a diagram of an electronic device according to an embodiment of the present invention, and FIG. 3 is a partial view of the electronic device in FIG. 2. Referring to FIG. 2 and FIG. 3 together, in embodiment of the present embodiment, the electronic device 400 is, for example, a mobile phone with camera function. The electronic device 400 includes a first housing 410, a second housing 420, a photosensitive device 200, and an optical zoom lens module 300. The second housing 420 is disposed opposite to the first housing 410, and the material of the first housing 410 and the second housing 420 may be plastic or metal. The optical zoom lens module 300 is disposed between the first housing 410 and the second housing 420, and the photosensitive device 200 is disposed between the optical zoom lens module 300 and the second housing 420. The optical zoom lens module 300 is suitable for developing an image of an object after exposing the object on the photosensitive device 200. In the present embodiment, the photosensitive device 200 is, for example, a complementary metal oxide semiconductor (CMOS) device or a charge coupled device (CCD).

Figure 4:
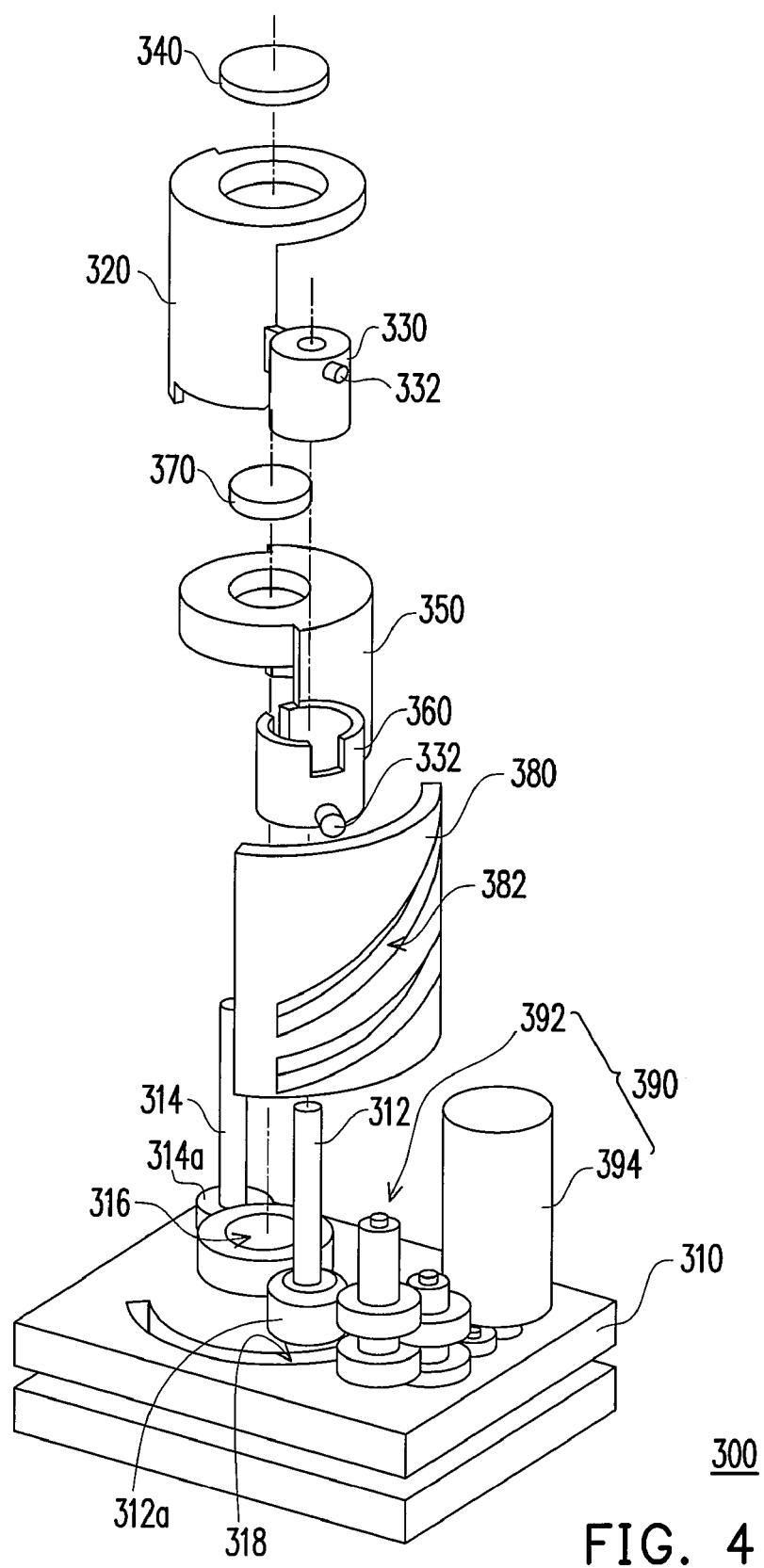
FIG. 4 is an exploded view of the optical zoom lens module in FIG. 3.
Figure 5:
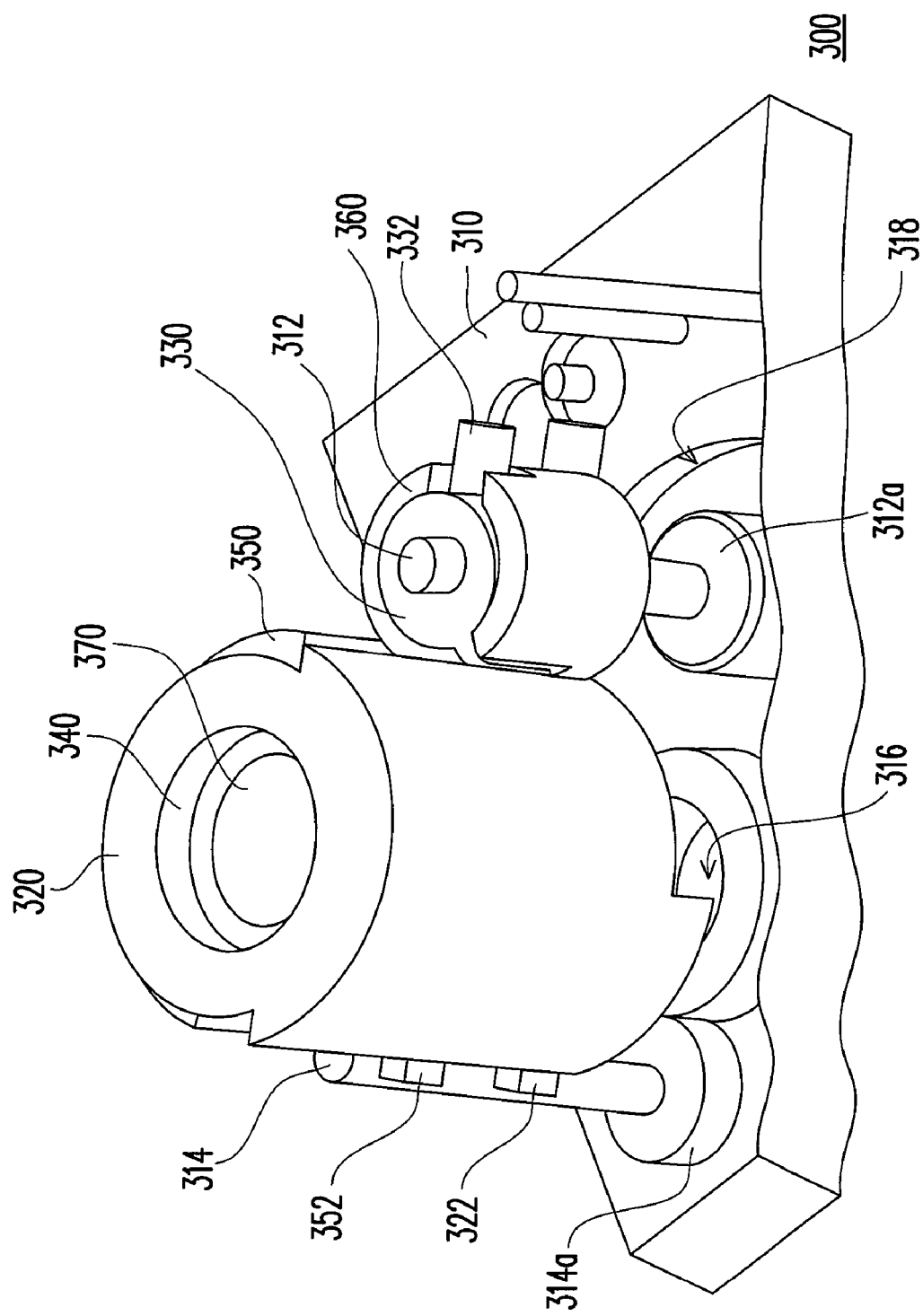
FIG. 5 is a partial view of the optical zoom lens module in FIG. 4.

FIG. 4 is an exploded view of the optical zoom lens module in FIG. 3, and FIG. 5 is a partial view of the optical zoom lens module in FIG. 4. Referring to FIGS. 3, 4, and 5, the optical zoom lens module 300 includes a base 310, a first lens holder 320, a first tracking controller 330, a first lens 340, a second lens holder 350, a second tracking controller 360, and a second lens 370. The material of the base 310 is plastic. The base 310 has a main shaft 312, a secondary shaft 314, and an opening 316, wherein the main shaft 312 and the secondary shaft 314 are disposed at one side of the base 310 away from the photosensitive device 200. In the present embodiment, the main shaft 312 and the secondary shaft 314 are, for example, formed with the base 310 as one piece. In other embodiments, the main shaft 312 and the secondary shaft 314 may also be disposed on the base 310 by using other methods such as structure fitting.

Moreover, the end of the main shaft 312 adjacent to the base 310 is a guiding portion 312a, and the diameter of the guiding portion 312a is greater than the diameters of other portions of the main shaft 312. The end of the secondary shaft 314 adjacent to the base 310 is a patching portion 314a, and the diameter of the patching portion 314a is greater than the diameters of other portions of the secondary shaft 314. Both the guiding portion 312a and the patching portion 314a have the function of enhancing the structural rigidity of the main shaft 312 and the secondary shaft 314.

Figure 6:
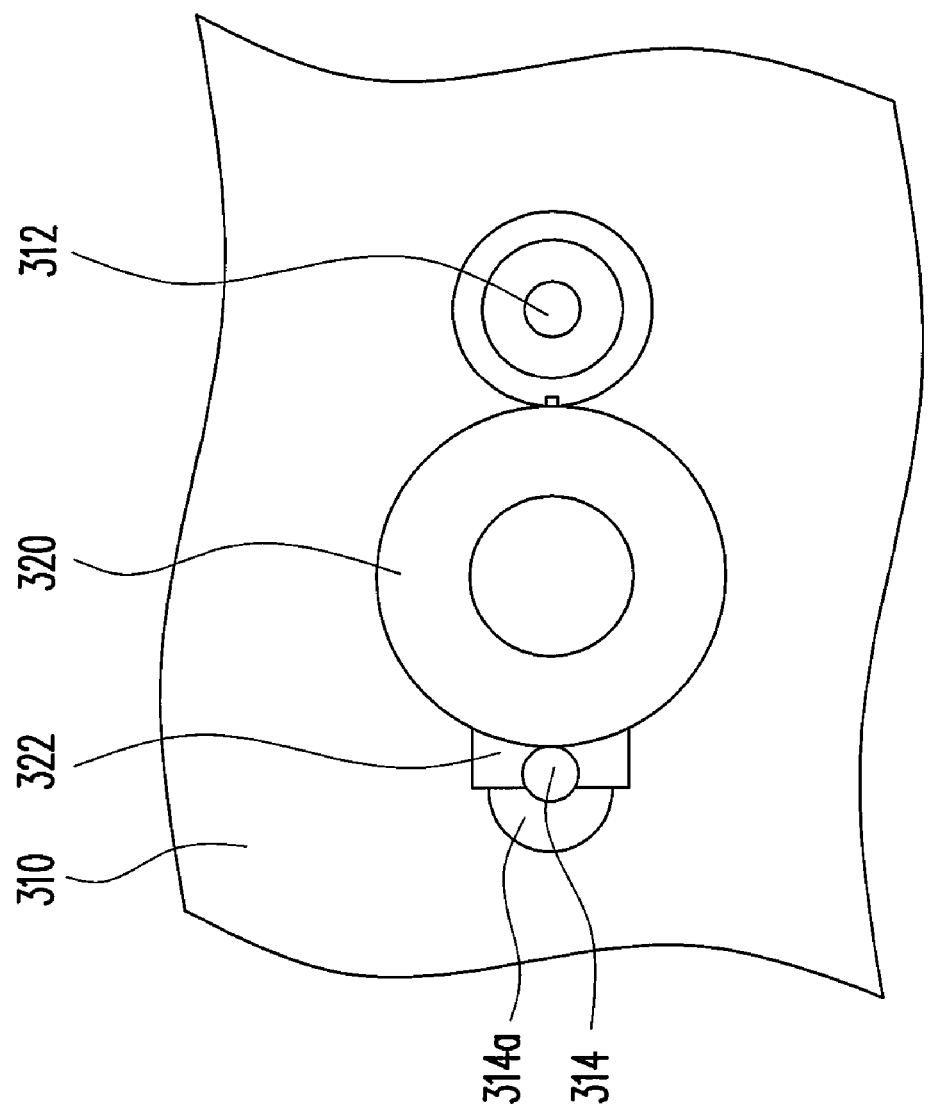
FIG. 6 is a partial vertical view of an optical zoom lens module.

As described above, the first lens holder 320 is disposed on the base 310 and located at one side of base 310 away from the photosensitive device 200, and the first lens holder 320 has a first fixing portion 322 disposed at the secondary shaft 314. FIG. 6 is a partial vertical view of an optical zoom lens module. To simplify the figure, only the base 310, the first lens holder 320, the main shaft 312, and the secondary shaft 314 are illustrated in FIG. 6. Referring to FIG. 6, in the present embodiment, the first fixing portion 322 is, for example, a "⊐" shape structure, and the first fixing portion 322 holds the secondary shaft 314 for restricting the first lens holder 320 from rotating with the main shaft 312 as an axis, however, the present invention is not limited hereto. In other embodiments, the first fixing portion 322 may also be an annular structure covering the secondary shaft 314 for preventing the first lens holder 320 from rotating. Besides, the first tracking controller 330 is connected to the first lens holder 320, the first tracking controller 330 covers the main shaft 312, and the first lens 340 is disposed on the first lens holder 320 and above the opening 316. Since the first tracking controller 330 covers the main shaft 312 and the first fixing portion 322 is disposed on the secondary shaft 314, the first lens holder 320 is restricted to only moving up and down along the direction of the height of the main shaft 312, but cannot rotate around the main shaft 312.

Referring to FIGS. 3, 4, and 5 again, the second lens holder 350 is disposed on the base 310 and located at the side of the base 310 away from the photosensitive device 200. The second lens holder 350 having a second fixing portion 352 is also disposed on the secondary shaft 314. Since the function and the structure of the second fixing portion 352 in the present embodiment is the same as that of the first fixing portion 322, the second fixing portion 352 will not be described in detail herein. Besides, the second tracking controller 360 is connected to the second lens holder 350, wherein the second tracking controller 360 is disposed on the main shaft 312 and covers with the first tracking controller 330. In the present embodiment, the second tracking controller 360 covers the first tracking controller 330. However, the relative positions of the second tracking controller 360 and the first tracking controller 330 are not limited in the present embodiment. That is, in another embodiment, the first tracking controller 330 may cover the second tracking controller 360. In addition, the second lens 370 is disposed on the second lens holder 350 and between the first lens 340 and the opening 316.

Next, referring to both FIG. 3 and FIG. 4, the optical zoom lens module 300 further includes an arc guiding plate 380 disposed on the base 310 and located outside of the first tracking controller 330 and the second tracking controller 360. The arc guiding plate 380 is used for driving the first tracking controller 330 and the second tracking controller 360 to move, so as to adjust the relative distance between the first lens 340 and the second lens 370 for optical zooming. In the present embodiment, the base 310 has, for example, an arc slot 318, and the arc guiding plate 380 is locked in the arc slot 318. However, the present embodiment is not limited hereto. It should be mentioned that the disposition space of the arc guiding plate 380 on the base 310 is small since the arc guiding plate 380 is disposed surrounding the main shaft 312 and the shape thereof fits the shape of the tracking controllers.

In addition, the arc guiding plate 380 has a plurality of guiding slots 382, and the first tracking controller 330 and the second tracking controller 360 have a bump 332 respectively, wherein each bump 332 is suitable for moving along the corresponding guiding slot 382 to drive the first tracking controller 330 and the second tracking controller 360 to move relatively. In another embodiment, the arc guiding plate 380 may also have a plurality of bumps 332, and the first tracking controller 330 and the second tracking controller 360 have a guiding slot 382 respectively so that the bumps 332 drive the first tracking controller 330 and the second tracking controller 360 to move relatively along the guiding slots 382. Accordingly, the spirit of the present invention is not limited to the structure and method disclosed in the present embodiment as long as the arc guiding plate 380 can drive the first tracking controller 330 and the second tracking controller 360 to move relatively.

Moreover, the optical zoom lens module 300 further includes a transmission mechanism 390 disposed on the base 310. The transmission mechanism 390 includes a gear 392 and a driving motor 394, wherein the gear 392 is disposed outside of the arc guiding plate 380 and meshes with the arc guiding plate 380. The driving motor 394 is also disposed on the base 310 and meshes with the gear 392, wherein the driving motor 394 drives the arc guiding plate 380 to swing through the gear 392, so that the first tracking controller 330 can move relatively to the second tracking controller 360 in the direction of the height of the main shaft 312, so as to adjust the optical zoom multiple of the electronic device 400.

Figure 1A:
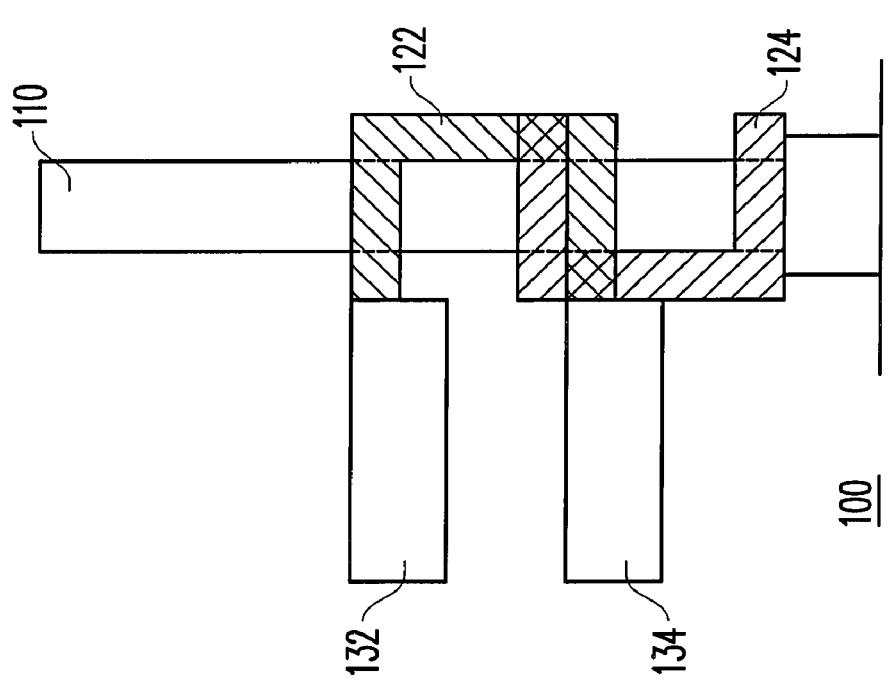
FIG. 1A is a diagram of a conventional optical zoom lens module at 2× optical zoom.
Figure 1B:
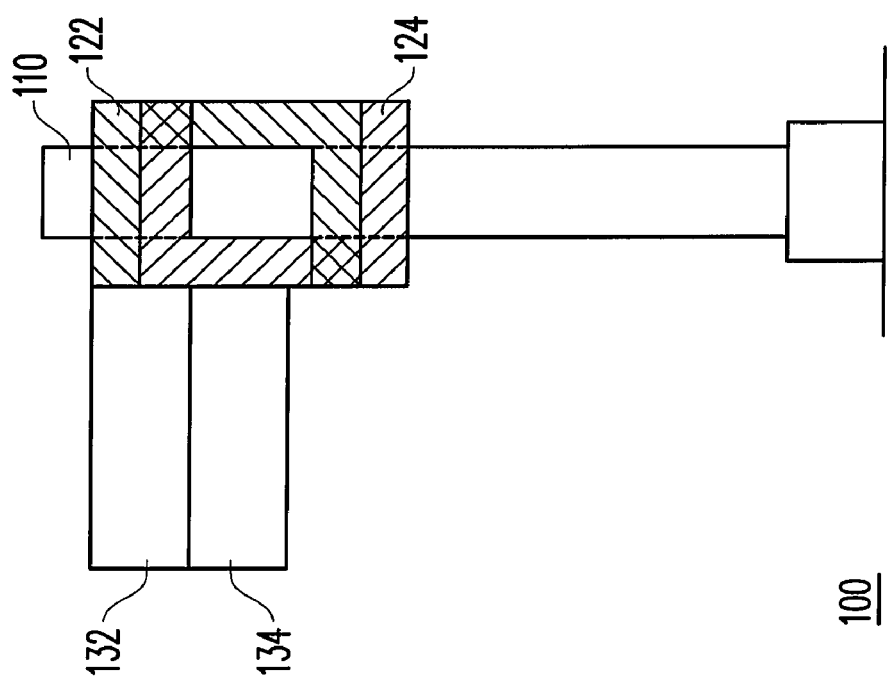
FIG. 1B is a diagram of the optical zoom lens module in FIG. 1A at 1× optical zoom.
Figure 7B:
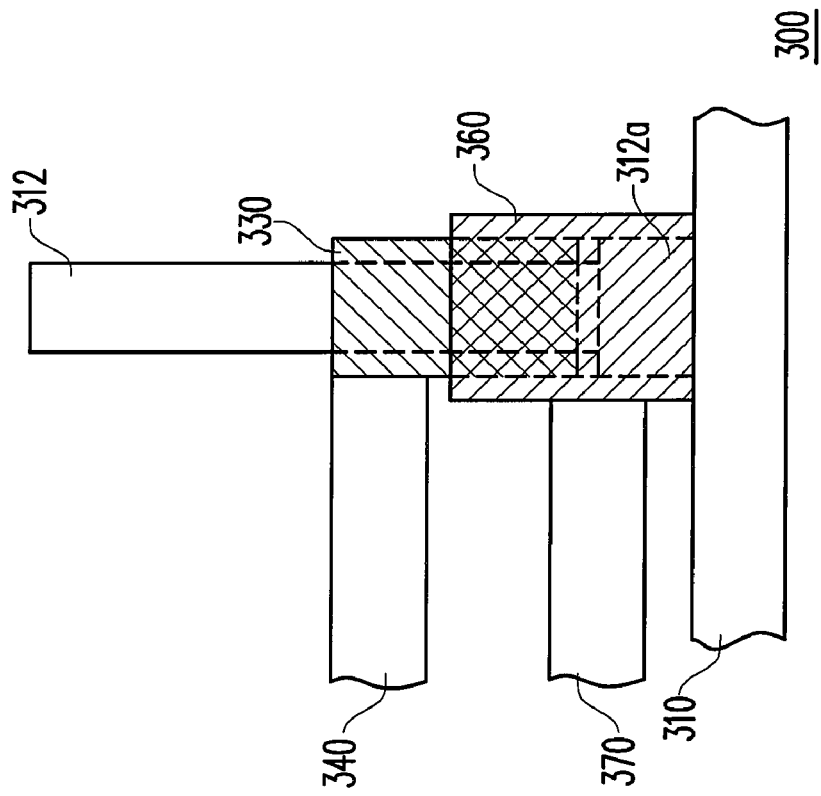
FIG. 7B is a partial view of the optical zoom lens module in FIG. 7A at 1× optical zoom.
Figure 7A:
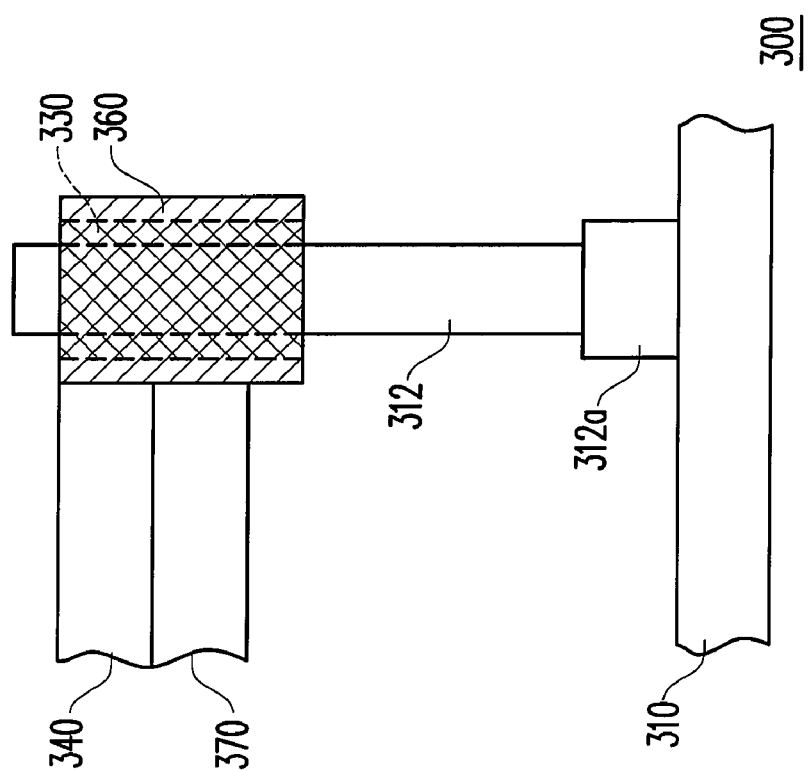
FIG. 7A is a partial view of the optical zoom lens module in FIG. 3 at 2× optical zoom.

FIG. 7A is a partial view of the optical zoom lens module in FIG. 3 at 2× optical zoom. To simplify the figure, the first lens holder 320 and the second lens holder 350 are skipped, and only the first lens 340 and the second lens 370 are illustrated in FIG. 7A. Referring to FIG. 7A, when the optical zoom lens module 300 is at 2× optical zoom, the first lens 340 is adjacent to the second lens 370, and the first lens 340 and the second lens 370 are located at the high point of the main shaft 312. It should be noted that the first tracking controller 330 and the second tracking controller 360 do not form the conventional span taking up the height of the main shaft 312 because the first tracking controller 330 and the second tracking controller 360 cover each other. Thus, the influence of the span can be avoided when designing the height of the main shaft 312, and the height of the main shaft 312 is shorter than that of the conventional main shaft 110 as shown in FIG. 1A.

FIG. 7B is a partial view of the optical zoom lens module in FIG. 7A at 1× optical zoom. Similarly, to simplify the figure, only the first lens 340 and the second lens 370 are shown while the first lens holder 320 and the second lens holder 350 are skipped in FIG. 7B. Referring to FIGS. 7A, 3, and 7B all together, in specific, when the user adjusts the optical zoom multiple of the optical zoom lens module 300 in the electronic device 400, the driving motor 394 drives the gear 392 to rotate, and the gear 392 further drives the arc guiding plate 380 to swing along the arc slot 318. Here, the bumps 332 move along the corresponding guiding slot 382 respectively and drive the first tracking controller 330 to move relatively to the second tracking controller 360 in the direction of the height of the main shaft 312, so that the first lens 340 is away from the second lens 370. When the bottom of the second tracking controller 360 slowly leaves the first tracking controller 330, the bottom of the second tracking controller 360 touches the guiding portion 312a and continues moving along the guiding portion 312a. It should be noted that besides guiding the moving of the second tracking controller 360, the guiding portion 312a also has the function of stabilizing the bottom of the second tracking controller 360, so that the shifting of the second tracking controller 360 due to its bottom swing, which affect the optical zoom effect, can be prevented when the second tracking controller 360 moves.

When the optical zoom lens module 300 is at 1× optical zoom, the first lens 340 is away from the second lens 370, and the bottom of the second tracking controller 360 covers the guiding portion 312a. Because the first tracking controller 330 and the second tracking controller 360 do not form the span which takes up the height of the main shaft 312 after the optical zoom lens module 300 zooms, only the zooming interaction distance of the first lens 340 and the second lens 370 is considered for designing the height of the main shaft 312, such that the height of the main shaft 312 is shorter than that in conventional optical zoom lens module, and the thickness of the electronic device 400 can be reduced.

In overview, according to the electronic device of the present embodiment, when the optical zoom lens module zooms, the two tracking controllers covering each other move in the direction of the height of the main shaft at the same time. Since the two tracking controllers cover each other, the problem of span taking up the height of the main shaft can be resolved, so that the height of the main shaft can be lowered, thereby reducing the thickness of the electronic device. Moreover, in the electronic device of the present embodiment, an arc guiding plate is used as the transmission mechanism for driving the optical zoom lens module to zoom, and through the special shape of the arc guiding plate, the disposition space of the arc guiding plate on the base is small when the arc guiding plate drives the optical zoom lens module to zoom, thus the space taken can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical zoom lens module, suitable for an electronic device, the optical zoom lens module comprising:

a base, having a main shaft, a secondary shaft, and an opening;

a first lens holder, disposed on the base, having a first fixing portion disposed on the second shaft;

a first tracking controller, connected to the first lens holder, and the first tracking controller covers the main shaft;

a first lens, disposed on the first lens holder and above the opening;

a second lens holder, disposed on the base, having a second fixing portion disposed at the secondary shaft;

a second tracking controller, connected to the second lens holder, and the second tracking controller covers the main shaft, wherein the first and the second tracking controllers cover each other; and a second lens, disposed on the second lens holder and between the first lens and the opening, wherein the first and the second tracking controllers are suitable for moving along the main shaft to adjust the relative distance between the first lens and the second lens.

2. The optical zoom lens module as claimed in claim 1, wherein the first tracking controller covers the second tracking controller.

3. The optical zoom lens module as claimed in claim 1 further comprising an arc guiding plate disposed on the base and located outside of the first and the second tracking controllers, and the arc guiding plate suitable for driving the first tracking controller and the second tracking controller to move, so as to adjust the relative distance between the first lens and the second lens.

4. The optical zoom lens module as claimed in claim 3, wherein the arc guiding plate has a plurality of guiding slots, and the first and the second tracking controllers respectively have a bump, wherein the bumps are suitable for moving along one of the guiding slots respectively to drive the first tracking controller to move relatively to the second tracking controller.

5. The optical zoom lens module as claimed in claim 4 further comprising a transmission mechanism disposed on the base and located outside of the arc guiding plate, the transmission mechanism comprising:

a gear, disposed outside of the arc guiding plate and meshing with the arc guiding plate; and a driving motor, disposed on the base and meshing with the gear to drive the arc guiding plate through the gear, so that the first tracking controller moves relatively to the second tracking controller.

6. The optical zoom lens module as claimed in claim 3, wherein the base has an arc slot, and the arc guiding plate is locked with the arc slot.

7. An electronic device, comprising:

a first housing;

a second housing, opposite to the first housing;

an optical zoom lens module, disposed between the first housing and the second housing, the optical zoom lens module comprising:

a base, having a main shaft, a secondary shaft, and an opening;

a first lens holder, disposed on the base, having a first fixing portion disposed at the secondary shaft;

a first tracking controller, connected to the first lens holder, and the first tracking controller covers the main shaft;

a first lens, disposed on the first lens holder and above the opening;

a second lens holder, disposed on the base, having a second fixing portion disposed on the secondary shaft;

a second tracking controller, connected to the second lens holder, and the second tracking controller covers the main shaft, wherein the first and the second tracking controllers cover each other;

a second lens, disposed on the second lens holder and between the first lens and the opening, wherein the first and the second tracking controllers are suitable for moving along the main shaft to adjust the relative distance between the first lens and the second lens; and a photosensitive device, disposed between the optical zoom lens module and the second housing.

8. The electronic device as claimed in claim 7, wherein the first tracking controller covers the second tracking controller.

9. The electronic device as claimed in claim 7 further comprising an arc guiding plate disposed on the base and located outside of the first and the second tracking controllers, and the arc guiding plate suitable for driving the first tracking controller and the second tracking controller to move, so as to adjust the relative distance between the first lens and the second lens.

10. The electronic device as claimed in claim 9, wherein the arc guiding plate has a plurality of guiding slots, and the first and the second tracking controllers have a bump respectively, wherein the bumps are suitable for moving along one of the guiding slots respectively, so as to drive the first tracking controller to move relatively to the second tracking controller.

11. The electronic device as claimed in claim 10 further comprising a transmission mechanism disposed on the base and located outside of the arc guiding plate, the transmission mechanism comprising:

a gear, disposed outside of the arc guiding plate and meshing with the arc guiding plate; and a driving motor, disposed on the base and meshing with the gear to drive the arc guiding plate through the gear, so that the first tracking controller moves relatively to the second tracking controller.

12. The electronic device as claimed in claim 9, wherein the base has an arc slot, and the arc guiding plate is locked with the arc slot.

13. The electronic device as claimed in claim 7, wherein the material of the first housing and the second housing is plastic or metal.

14. The electronic device as claimed in claim 7, wherein the photosensitive device comprises a complementary metal oxide semiconductor (CMOS) device or a charge coupled device (CCD).

* * * * *